(12) United States Patent
Barrett et al.

(10) Patent No.: US 11,153,106 B2
(45) Date of Patent: Oct. 19, 2021

(54) SYSTEM FOR IMPROVED TRAFFIC HANDLING IN A NETWORK

(71) Applicant: TELEFONAKTIEBOLAGET LM ERICSSON (PUBL), Stockholm (SE)

(72) Inventors: Niamh Barrett, Solna (SE); Johan Kölhi, Vaxholm (SE); Dan Mathiasen, Nacka (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 181 days.

(21) Appl. No.: 15/549,607

(22) PCT Filed: Feb. 9, 2015

(86) PCT No.: PCT/EP2015/052616
§ 371 (c)(1),
(2) Date: Aug. 8, 2017

(87) PCT Pub. No.: WO2016/128015
PCT Pub. Date: Aug. 18, 2016

(65) Prior Publication Data
US 2018/0026802 A1 Jan. 25, 2018

(51) Int. Cl.
*H04L 12/14* (2006.01)
*H04L 12/24* (2006.01)
(Continued)

(52) U.S. Cl.
CPC ...... *H04L 12/1407* (2013.01); *H04L 41/0893* (2013.01); *H04L 41/5019* (2013.01);
(Continued)

(58) Field of Classification Search
CPC ............... H04M 15/66; H04L 12/1407; H04L 41/0893; H04L 41/5019; H04L 61/1511
(Continued)

(56) References Cited

U.S. PATENT DOCUMENTS

2010/0284327 A1* 11/2010 Miklos ................. H04W 8/082
370/328
2012/0016995 A1* 1/2012 You ...................... H04L 47/782
709/226

(Continued)

OTHER PUBLICATIONS

International Search Report and Written Opinion dated Nov. 4, 2015, in International Application No. PCT/EP2015/052616, 9 pages.
(Continued)

*Primary Examiner* — Christopher M Crutchfield
*Assistant Examiner* — Jean F Voltaire
(74) *Attorney, Agent, or Firm* — Sage Patent Group

(57) ABSTRACT

There is provided a system comprising a user device, a network and a service provider, wherein the user device communicates with a server operated by the service provider using the network. The system is arranged such that in response to receipt of user input requesting initiation of communication with the service provider, the user device sends a policy enforcement request to policy contact point in the network. The system is further arranged such that the network receives the policy enforcement request at the policy contact point and applies at least one policy rule to the communication between the user device and the service provider.

22 Claims, 6 Drawing Sheets

(51) Int. Cl.
  *H04M 15/00* (2006.01)
  *H04L 29/06* (2006.01)
  *H04L 29/12* (2006.01)

(52) U.S. Cl.
  CPC .............. *H04L 63/10* (2013.01); *H04L 63/20* (2013.01); *H04M 15/66* (2013.01); *H04L 12/1496* (2013.01); *H04L 41/28* (2013.01); *H04L 61/1511* (2013.01)

(58) Field of Classification Search
  USPC ........................................................ 370/259
  See application file for complete search history.

(56) References Cited

U.S. PATENT DOCUMENTS

| | | | | |
|---|---|---|---|---|
| 2012/0131165 A1* | 5/2012 | Baniel | ..................... | H04L 67/34 709/223 |
| 2013/0044645 A1* | 2/2013 | Castro Castro | ......... | H04L 12/14 370/259 |
| 2013/0044646 A1* | 2/2013 | Qu | ......................... | H04W 4/24 370/259 |
| 2013/0316674 A1* | 11/2013 | Cho | ...................... | H04M 15/66 455/406 |
| 2014/0181518 A1* | 6/2014 | Kim | .................... | H04W 12/041 713/168 |
| 2014/0376412 A1* | 12/2014 | Li | ......................... | H04M 15/66 370/259 |
| 2015/0131488 A1* | 5/2015 | Perez Martinez | .... | H04M 15/77 370/259 |
| 2015/0236962 A1* | 8/2015 | Veres | .................... | H04L 47/822 370/230.1 |

OTHER PUBLICATIONS

Nimish Radio et al, "Next-Generation Applications on Cellular Networks: Trends, Challenges, and Solutions", Proceedings of the IEEE, IEEE. New York, US, (Apr. 1, 2012), vol. 100, No. 4, doi:10.1109/JPROC.2011.2182092, ISSN 0018-9219, pp. 841-854, XP011439333.

European Office Action issued in corresponding EP Application No. 15703577.5 dated Apr. 28, 2020, 07 Pages. The references cited therein have previously been made of record.

\* cited by examiner

SYSTEM FOR IMPROVED TRAFFIC HANDLING IN A NETWORK

CROSS REFERENCE TO RELATED APPLICATION(S)

This application is a 35 U.S.C. § 371 National Phase Entry Application from PCT/EP2015/052616, filed Feb. 9, 2015, designating the United States, the disclosure of which is incorporated herein in its entirety by reference.

TECHNICAL FIELD

The present application relates to: a system comprising a user device, a network and a service provider; a user device; a method in a user device; a network comprising a policy contact point; a method in a policy contact point; a service provider; a server, and a computer readable medium.

BACKGROUND

Over-the-top (OTT) services are becoming increasingly popular. These services allow consumers to access OTT content through internet-connected devices such as desktop and laptop computers, gaming consoles, set-top boxes, smartphones, smart TVs, home theatre PCs, tablets, or any device with network connectivity. The OTT content may be accessed through a dedicated client application on the device, or through a web-browser.

An internet-connected device connects to the internet via a network. The network operator may be an internet service provider (ISP) or a mobile network operator (MNO). In most instances a user of the device pays the network operator for the use of their network. Sometimes, a third party pays the network operator on behalf of the user, such as "free" WiFi in hotels and coffee shops. In any event, one reason OTT content gets its name is that the content is delivered over the operator's network independent of the network operator.

OTT content delivery may be contrasted with services such as IPTV where a network operator provides content to a user over their network and using the Internet Protocol (IP). Because the network operator manages the network and provides the IPTV service, the network operator is able to closely manage its network resources to provide secure and reliable delivery of content to subscribers. In contrast to video over the public Internet, in IPTV deployments the network security and performance are tightly managed to ensure a good quality of service for all users.

When carrying OTT content, the network operator may be aware of the contents of the IP packets but it is not responsible for, nor able to control the content. The network operator may attempt to carry all traffic for all client devices with equal priority. This can give rise to a situation where a client device streaming some high bandwidth content consumes a large proportion of the network resources available to a subset of users in a part of the network. In such a situation the client device may be said to be acting as a bandwidth hog. Further, OTT content providers have various different quality of service (QoS) mechanisms that use the operators' networks in different ways. This means that the network operators are often unable to adapt according to the varying demands of the user devices connected to their network.

Furthermore, encryption is often employed in the provision of OTT content. For example, Netflix delivers video content to its users in encrypted packets. The encryption makes it impossible for the network operator to inspect, detect and subsequently enforce actions (e.g. QoS, optimization, etc.) on such traffic.

At present, any control, QoS or optimization mechanisms applied by the operator's network may conflict with any control, QoS or optimization mechanisms implemented by the OTT service provider. This conflict is likely to have a detrimental effect on user experience.

SUMMARY

Accordingly, there is provided a system comprising a user device, a network and a service provider. The user device communicates with a server operated by the service provider using the network. In response to receipt of user input requesting initiation of communication with the service provider, the user device sends a policy enforcement request to a policy contact point in the network. The network receives the policy enforcement request at the policy contact point and applies at least one policy rule to the communication between the user device and the service provider.

The system and apparatus described herein provide a mechanism whereby a service provider can send a communication policy request to a network that handles the traffic between the service provider and its user. The mechanism for delivering a communication policy request allows the service provider and the network operator to work together to efficiently deliver a good service to the user device.

The user device may retrieve a policy from the service provider. The policy may be predefined at the user device by the service provider. The predefined policy may be managed by an installed application at the user device. The user device may further retrieve, from a DNS server, the address in the network of a policy contact point. The at least one policy rule may comprise a charging rule.

The charging rule may comprise charging a user account associated with the user device for using the service with a charge outside of their normal data plan. Such a charge may be zero. The service provider may pay for, or subsidize the cost of using the network.

The at least one policy rule may comprise a traffic handling rule. The traffic handling rule may defines at least one of the following, for communication between the user device and the service provider using the network: a minimum service quality; a maximum service quality; a maximum latency; a minimum latency; a minimum bandwidth; a maximum bandwidth; a priority level; a rule for traffic optimization; and a rule for content optimization.

The traffic optimization rule may comprise a rule defining TCP flows. A rule for content optimization may include a requirement to compress certain data. A rule may comprise a maximum and minimum value defining a range. A policy may comprise a plurality of rules.

In response to receipt of user input requesting initiation of communication with the service provider, the user device may retrieve a policy rule from the service provider before sending a policy enforcement request to a policy contact point in the network. The policy may be dynamic, and may be updated upon initiation of communication, or even during an ongoing communication session between the user device and the service provider.

The policy enforcement request may comprise at least one policy rule, and may be digitally signed by the service provider. The policy enforcement request includes a digital signature of the service provider. The digital signature comprises a signer certificate. The signer certificate is used to verify the authenticity of the policy enforcement request.

This is important to ensure a malicious user or application does not attempt to spoof a policy rule to obtain improved service or free network resource usages. The Policy Contact Point may also use the signer certificate to verify that the common name therein (e.g. Netflix.com) matches a service provider for which the network will accept policies.

There is further provided a user device arranged to communicate with a service provider using a network. The user device is arranged to receive a user input requesting initiation of communication with the service provider, and in response thereto send a policy enforcement request to a policy contact point in the network. The policy enforcement request may be generated by an application running on the user device and arranged to manage services and communication with the service provider. The policy enforcement request allows the service provider to deliver content in harmony with the network, with the network resources appropriately used.

The policy enforcement request may be digitally signed and comprise at least one policy rule. The policy enforcement request may be digitally signed by the service provider. The Policy Contact Point may use this to verify that the common name (e.g. Netflix.com) in the signer certificate matches a service provider for which the network will accept policies. The user device may be further arranged to consult a domain name server to identify the address of a policy contact point in the network.

The user input requesting initiation of communication with the service provider may comprise the user starting an application on the user device. The application may be provided by the service provider. The application may be provided by an app developer on behalf of a service provider.

There is further provided a method in a user device arranged to communicate with a service provider using a network. The method comprises receiving a user input requesting initiation of communication with the service provider; and in response thereto, sending a policy enforcement request to a policy contact point in the network.

The policy enforcement request may be digitally signed by the service provider and comprise the at least one policy rule. The method may further comprise consulting a domain name server to identify the address of a policy contact point in the network. The user input requesting initiation of communication with the service provider may comprise the user starting an application on the user device. The application may be provided by the service provider.

There is further provided a network comprising a policy contact point, the policy contact point arranged to: receive a policy enforcement request from a user device, the policy enforcement request comprising at least one policy rule; verify the authenticity of the policy enforcement request; and apply, in response to an authentic policy enforcement request, the at least one policy rule received in the policy enforcement request to communications within the network and between the user device and a service provider.

There is further provided a method in a policy contact point, the policy contact point comprising a node within a network, the method comprising: receiving a policy enforcement request from a user device, the policy enforcement request comprising at least one policy rule; verifying the authenticity of the policy enforcement request; applying, in response to an authentic policy enforcement request, the at least one policy rule received in the policy enforcement request to communications within the network and between the user device and a service provider.

There is further provided a service provider arranged to receive a policy request from a user device and to reply with a digitally signed policy comprising at least one policy rule. The digitally signed policy, when implemented in the network allows the service provider to influence how its traffic is handled in the network.

The service provider may be further arranged to receive, via the user device, a policy enforcement confirmation from the network, the policy enforcement confirmation comprising at least one policy rule, and in response thereto the service provider communicates with the user device in compliance with the at least one policy rule.

The service provider may be further arranged to receive a policy enforcement request from a user device when said policy enforcement request is not intercepted by a network node, and in response thereto the service provider communicates with the user device. The network node may comprise a policy contact point.

There is further provided a server, comprising a processor, a memory, a storage device and a network interface, the server arranged to operate according to any of the processes described herein.

There is further provided a method in a service provider, the method comprising: receiving a policy request from a user device; and replying with a digitally signed policy comprising the service provider name and at least one policy rule.

The method may further comprise receiving, via the user device, a policy enforcement confirmation from the network, the policy enforcement confirmation comprising at least one policy rule, and in response thereto the method comprises communicating with the user device in compliance with the at least one policy rule.

The method may further comprise receiving a policy enforcement request from a user device when said policy enforcement request is not intercepted by a network node, and in response thereto communicating with the user device. The network node may comprise a policy contact point.

There is further provided a user device arranged to communications with a service provider using a network, the user device comprising a processor and a memory, said memory containing instructions executable by said processor whereby said apparatus is operative to: receive a user input requesting initiation of communication with the service provider; and in response thereto send a policy enforcement request to a policy contact point in the network.

There is further provided a user device arranged to communications with a service provider using a network, the user device comprising a processor and a memory, said memory containing instructions executable by said processor whereby said apparatus comprises: means for receiving a user input requesting initiation of communication with the service provider; and means for sending a policy enforcement request to a policy contact point in the network in response to said user input requesting initiation of communication with the service provider.

There is further provided a computer-readable medium, carrying instructions, which, when executed by computer logic, causes said computer logic to carry out any of the methods defined herein.

There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

There is further provided a user device comprising a processor and memory, said memory containing instructions executable by said processor whereby said user terminal is operative to: receive a user input requesting initiation of communication with the service provider; and in response thereto send a policy enforcement request to a policy contact point in the network.

There is further provided a user device comprising an antenna, display, transceiver, processor and memory, said memory containing instructions executable by said processor whereby said user terminal is operative to: receive a user input requesting initiation of communication with the service provider; and in response thereto send a policy enforcement request to a policy contact point in the network. The user device may be adapted to store a message e.g. in a memory such as a flash drive or a hard disk.

The at least one policy rule may comprise a charging rule, or a traffic handling rule. A charging rule may comprise charging a user account associated with the user device for using the service with a charge outside of their normal data plan. Such a charge may be zero. The service provider may pay for, or subsidize the cost of using the network.

BRIEF DESCRIPTION OF THE DRAWINGS

A system for improved traffic handling in a communication network will now be described, by way of example only, with reference to the accompanying drawings, in which.

DETAILED DESCRIPTION

The system, method and apparatus described herein provide a service provider with the ability to express how their content should be handled by a network. Equally, the system, method and apparatus described herein provides a network operator with the ability to influence how to handle certain content over their network. A service provider can determine content handling by including policies in the applications they provide to users. A policy may comprise one or more policy rules. Such applications are often simply referred to as 'Apps'. This is particularly relevant to subscription services that use an App (e.g. Netflix); 'in-app purchase' Apps (e.g. AppStore, Candy crush etc.) and where policies can be based on user type, time of day etc. Further, a network operator can offer further functionality to network users and service providers. Such functionality includes:

Toll-free data, where the service provider pays for the data connection for a user to use their service;

Sponsored data, where a sponsor pays for the data connection in return for advertising to the user;

App promotion, where an app store or developer encourages app installation by paying for the data connection to download an app;

Guaranteed minimum bandwidth when using a particular service, paid for by the service provider; or Guaranteed maximum latency when playing a game online, paid for by the game developer.

In a further example, a third party such as an app-store owner may receive credit from the network operator in return for an agreement that app updates from their app-store are delivered at a lower priority for example on a best effort basis over the operators network. The app-store may then choose to spend this credit by promoting a certain app, by offering it for download without affecting the user's data quota, that is, not counting against the user's data allowance. This may be termed sponsored data, toll-free data, zero-rated download, or a no-quota-download. The app-store may choose to pay for the downloads using earned credit for the data connection to download the promoted app.

Figure 1:
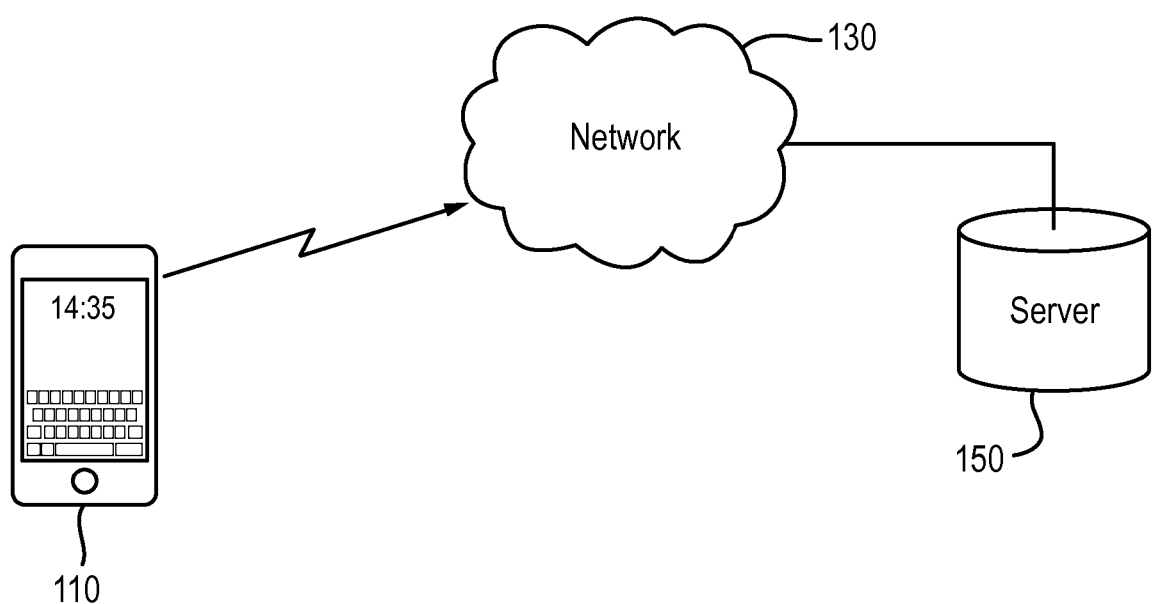
FIG. 1 shows a typical arrangement whereby a user device connects via a network to a server.

FIG. 1 shows a typical arrangement whereby a user device 110 connects via a network 130 to a server 150. Server 150 hosts a service on behalf of a service provider. Here, user device 110 comprises a smartphone having a touchscreen, processor, memory, and a wireless communications connection. The network 130 is a wireless communications network which uses the Long Term Evolution (LTE) communication protocol.

Server 150 and wireless communication network 130 are shown as directly connected in FIG. 1. In another example, the server and the network are connected by a portion of the internet. Alternatively, a content delivery network may be used to mirror content and services from server 150 to a node next to, or within the network 130. In any of these arrangements, the wireless communications network is responsible for carrying data from the server 150 over the final leg to the user device 150.

In another example, not illustrated, the user device is a desktop PC in a user's home, which connects via an ADSL modem to an ISP network, which in turn provides internet access to the desktop PC. Here, the 'final leg' is better referred to as the final leg to the home, because in the home the desktop PC likely connects to the ADSL modem via local area network, which may include a home WiFi link.

Figure 2:
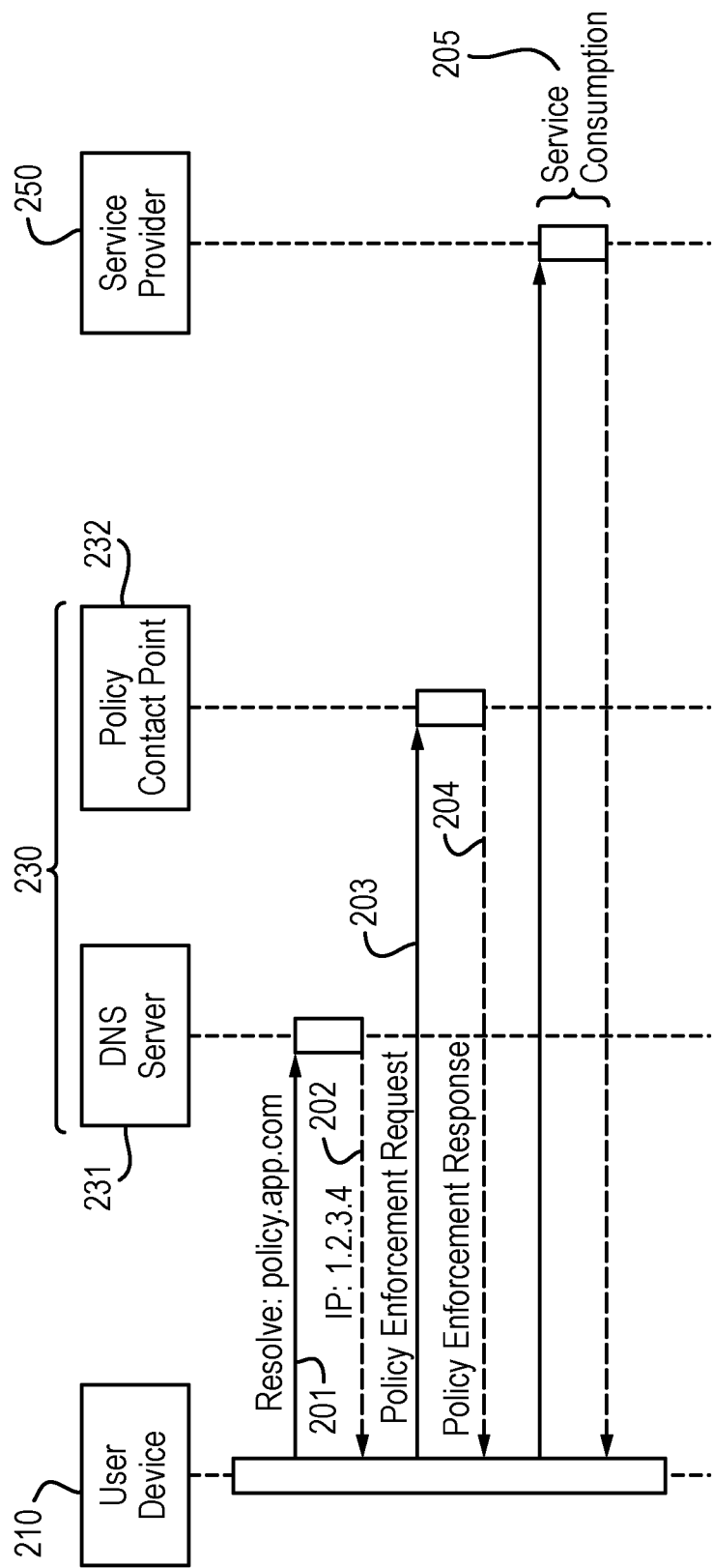
FIG. 2 is a messaging diagram showing the chain of events when a connection to a service provider is initiated by a user device, the connection being carried by a network.

FIG. 2 is a messaging diagram showing the chain of events when a connection to a service provider 250 is initiated by a user device 210, the connection being carried by a network 230. The process begins when an application (App) is launched at the user device 210, the App provides a user with access to the service provided by the service provider 250. The App is developed and maintained by the service provider. The App comprises predefined policies which the service provider would like enforced in a network carrying data between it and its users.

Network 230 includes a Domain Name System (DNS) server 231. DNS is a hierarchical distributed naming system for computers, services, or any resource connected to the Internet or a private network. It translates domain names, which can be easily memorized by humans, to the numerical IP addresses needed for computers to communicate with each other over an IP network.

Network 230 further includes a policy contact point 232. This is the node within the operator's network that receives requests for certain policy rules to be enforced. The policy contact point 232 is able to receive such requests and enforce them for certain communications within the network. The policy contact point 232 has a fully qualified domain name (FQDN), sometimes also referred to as an absolute domain name. The FQDN is a domain name that specifies its exact location in the tree hierarchy of the Domain Name System (DNS). A fully qualified domain name is distinguished by its lack of ambiguity: it can be interpreted only one way.

At 201, the App causes the user device 210 to send a message to the DNS server 231 calling for DNS resolution of the FQDN of the policy contact point 232. The name of the policy contact point 232 is defined within a digitally signed policy held in the App, put there by the service provider. At 202 the DNS server 231 resolves the FQDN of the policy contact point in the operator network and returns this to the user device 210. At 203 the App sends a policy enforcement request in an attempt to contact the policy contact point 232 in the operator network and uses the IP address returned by the DNS server in 202. The policy enforcement request contains the digitally signed policies and is received at the policy contact point 232.

Upon receipt of the policy enforcement request, the Policy Contact Point 232 verifies that the signer certificate Common Name is a known Common Name from a white list of Service Providers. Then, the signer certificate is verified using an encryption framework such as OpenSSL (Open Secure Sockets Layer). This means that the signer certificate can be verified towards a trusted certificate or certificate chain, locally stored. Furthermore, a check can be performed that the signer certificate has not been revoked or expired. If all steps in the verification succeed, the Policy Contact Point 232 enables the policies in the network 230 for communications between the user device 230 and service provider 250, and sends a policy enforcement response 304 to the user device 310.

At 205, the user device 210 is connected to the service provider 250 across network 230 with the requested policies enforced.

In summary, the system can be said to comprise a user device 210, a network 230 and a service provider 250, wherein the user device 210 communicates with a server operated by the service provider 250 using the network 230. This system is arranged such that the user device 210 sends a policy enforcement request to a policy contact point in the network in response to receipt of user input requesting initiation of communication with the service provider 250. The network 230 receives the policy enforcement request at the policy contact point 232 and applies at least one policy rule to the communication between the user device 210 and the service provider 250.

The system may be arranged such that the user device 210 retrieves, from a DNS sever 231, the address in the network 230 of a policy contact point 232.

This system provides a mechanism whereby a service provider 250 can cause a communication policy request to be sent to a network that handles the traffic between the service provider 250 and its user at a user device 210. The communication policy request allows the service provider 250 and the network operator 230 to work together to efficiently deliver a good quality of experience to the user of the user device 210.

In the above example, the user device has a predefined policy which it attempts to implement upon initiating communication with the service provider 250 across network 230. Although the policy is predefined at the user device, this is still in the control of the service provider, given that the service provider also provided the App and manages its updates.

Figure 3:
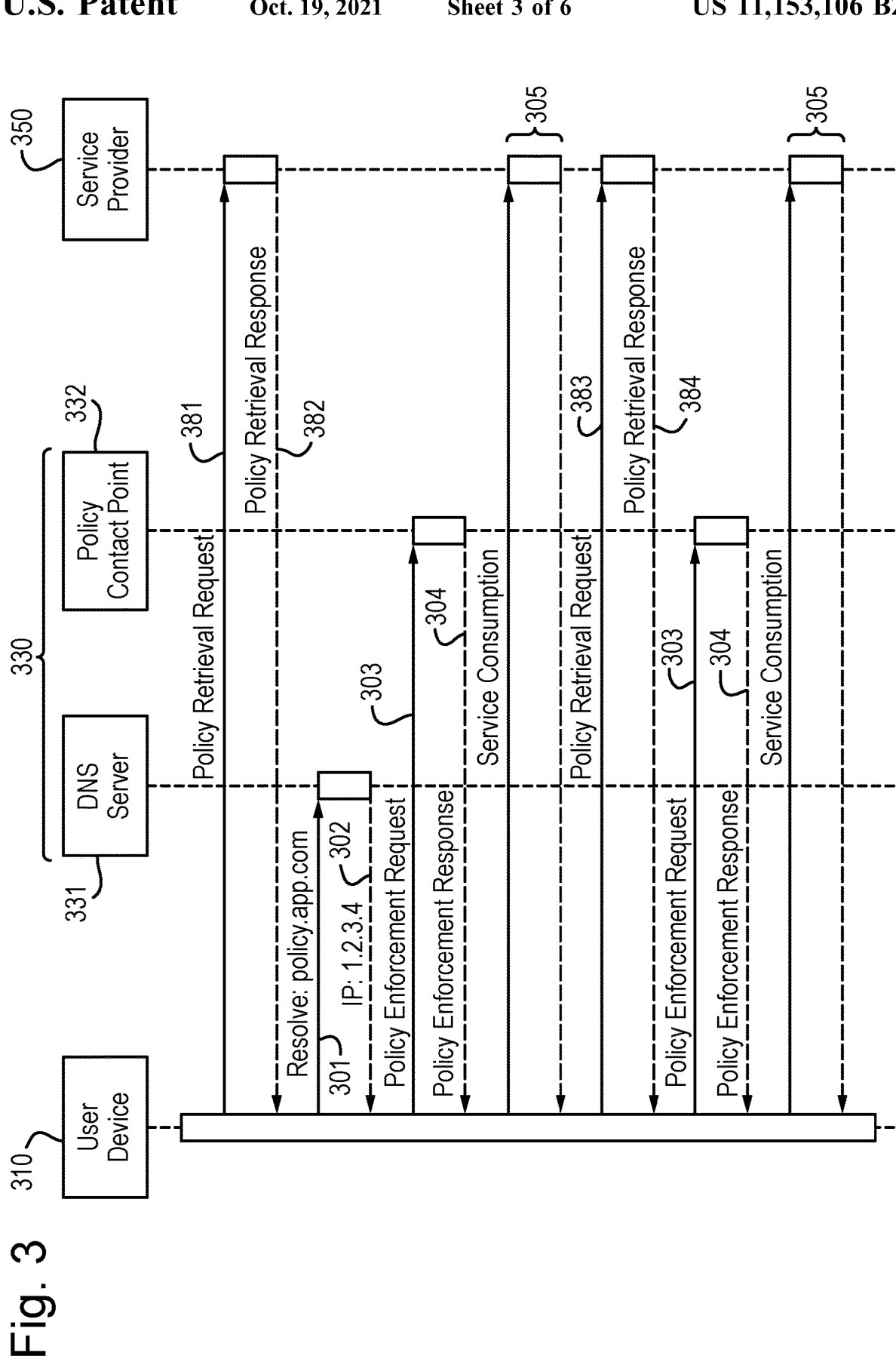
FIG. 3 is a messaging diagram showing a similar system to that of FIG. 2, but wherein the policy is dynamically updated.

FIG. 3 is a messaging diagram showing a similar system to that of FIG. 2, but wherein the policy is dynamically updated. The updating may be performed by the app downloading a current policy from the service provider. The process is initiated when a connection to a service provider 350 is initiated by a user device 310, the connection being carried by a network 330. The process begins when an application (App) is launched at the user device 210, the App provides a user with access to the service provided by the service provider 250. The App is developed and maintained by the service provider.

Network 330 includes a Domain Name System (DNS) server 331 and a policy contact point 332. These perform the same functions as described with reference to FIG. 2.

At 381, the App causes the user device 310 to send a message to the service provider 350. This message is a policy retrieval request, whereby the App contacts the service provider using a secure connection and authenticates the user to the service provider 350.

The service provider 350 authenticates the user and determines which policy rules shall be applied for this service. The policy rules are digitally signed and returned to the App at 382 in a policy retrieval response using the secure connection.

Subsequent to the latest policy rules being retrieved by user device 310, the process proceeds to service consumption 305 substantially as described with reference to FIG. 2. At 301 the user device 310 calls for DNS resolution of the FQDN of the Policy Contact Point 332. At 302 the DNS server 331 returns the FQDN of the Policy Contact Point 332 to the user device 310. At 303 the App sends a policy enforcement request in an attempt to contact the Policy Contact Point 332 in the operator network, and if the policy enforcement is successful the policy contact point 332 replies with a policy enforcement confirmation at 304, and at 305, the user device 310 is connected to the service provider 350 across network 330 with the requested policies enforced.

The above process allows for a new policy to be implemented upon initiation of communication between a user device 310 and a service provider 350. However, in some situations, the service provider may wish to update the policy more frequently than on a per-session basis. For example, the network conditions may change during the session, or a charging policy may only be implemented for certain times of the day. The following process is an addition to the above process, but is also illustrated in FIG. 3.

After some period of service consumption 305, the user device 310 may identify a need to update the policy. This may comprise the App identifying that it is time to retrieve new policies and that it should issue a new Policy Retrieval Request to the service provider 350. At 383, the user device 310 sends a message to the service provider 350. This message is a further policy retrieval request, whereby the App contacts the service provider 350 using a secure connection and authenticates the user to the service provider 350. The service provider 350 authenticates the user and determines which policies should now be applied for this user device 310. The new policies are digitally signed and returned to the App at 384 in a policy retrieval response using the secure connection.

Subsequent to the updated policy being retrieved by user device 310, the process proceeds to service consumption 305 substantially as described above. At 303 the App sends a policy enforcement request in an attempt to contact the Policy Contact Point 332 in the operator network, and if the policy enforcement is successful the policy contact point 332 replies with a policy enforcement confirmation at 304, and at 305, the user device 310 is connected to the service provider 350 across network 330 with the requested policies enforced.

In this way the service provider 350, which controls the App in the user device 310, can periodically update at least one policy rule applied by network 330 to a service consumption session 305.

The policy rule applied in the network may comprise at least one rule for particular traffic. The particular traffic is traffic between the user device 310 and the service provider 350, as carried over the particular network 330. The at least one policy rule may comprise a charging rule and/or a traffic handling rule.

The charging rule may comprise charging a user account associated with the user device for using the service with a charge outside of their normal data plan. Such a charge may be zero. The service provider 350 may pay for, or subsidize the cost of using the network.

The traffic handling rule may define at least one of: a minimum service quality; a maximum service quality; a maximum latency; a minimum latency; a minimum bandwidth; a maximum bandwidth; a priority level; a rule for traffic optimization; and a rule for content optimization; for communication between the user device and the service provider using the network. The traffic optimization rule may comprise a rule defining TCP flows. A rule for content optimization may include a requirement to compress certain data. A rule may comprise both a maximum and minimum value defining a range.

As explained in the above examples, the policy rule may be a static rule that is requested every time the service is initiated. Alternatively, the policy rule may be dynamic and the user device may retrieve a current policy rule from the service provider upon initiating the service. Alternatively still, the policy rule may be updated during an ongoing communication session between the user device and the service provider.

The system and methods described herein are presented in the context of an App on the user device, the App being developed by the service provider. However, the system may equally be implemented where the service is accessed not via a dedicated App on the user device, but via a web browser. In such instances the service is accessed via a web-app which is an application run in the web browser. Such a web-app may use JavaScript locally to connect to a server that runs AJAX, for example. In such a situation a policy can be downloaded from the server upon initiation of a connection to the service provider's server.

Figure 4:
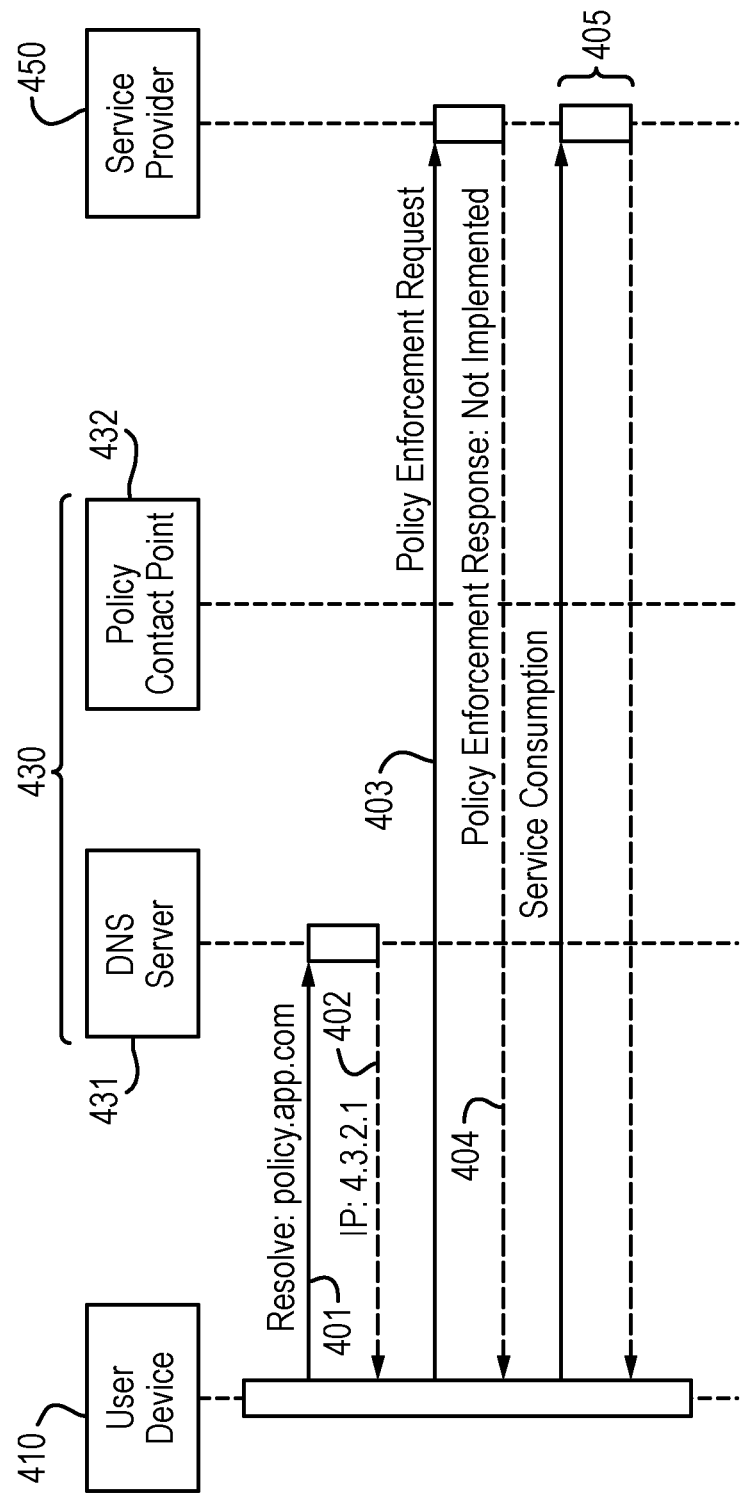
FIG. 4 is a messaging diagram showing a similar system to that of FIGS. 2 and 3, where a policy is not enforced by the network.

FIG. 4 is a messaging diagram showing a similar system to that of FIGS. 2 and 3, wherein a policy is requested by the App but where the policy is not enforced by the network 430. There are a number of reasons for the policy not to be enforced by the network 430. For example, network 430 may not have the capability to enforce discrete policy rules for a particular service. Network 430 may not have a valid agreement with service provider 450 about the policies it will enforce. The policy enforcement request from the user device 410 may not be appropriately signed, suggesting to the network 430 that the request may be a spoof or from a malicious source.

Network 430 includes a Domain Name System (DNS) server 431 and a policy contact point 432. These perform the same functions as described with reference to FIG. 2. As before, the process is initiated when a connection to a service provider 450 is initiated by a user device 410, the connection being carried by the network 430. At 401, the App calls for DNS resolution of the Policy Contact Point FQDN as defined in the digitally signed policy using the operator DNS server 431. At 402, the DNS server 431 resolves the FQDN to the service provider 450.

At 403, the App attempts to contact the Policy Contact Point 432 and uses the IP address returned from the DNS in 402. The request is not intercepted by the Service provider 450 but passes on to be received at the service provider 450.

Upon receipt of the policy enforcement request 403, the service provider 450 determines that the request was not intercepted in the operator network 430 and thus no policies can be enforced in the network. The service provider 450 responds with service consumption 405 but with no policy enforcement implemented in the network 430.

Alternatively, this not shown in FIG. 4, the policy contact point 432 may receive the policy enforcement request 403 but reject it. In this situation the policy contact point 432 responds to the user device 410 with the status for each of the requested policies in the request. The user device 410 may forward these responses to the service provider 450. In response to these, the service provider 450 sends a confirmation message 404 'policy enforcement response: not implemented' to the user device 410.

Some of the policies available could include improved service or data services that don't count against a user's data quota. As mentioned above, these policies could be sufficiently attractive to cause certain users or Apps to attempt malicious behavior to implement a service when they are not entitled to do so. To help prevent this, the policy enforcement request, which comprises the at least one policy rule, is digitally signed. The digital signature is used to verify the authenticity of the policy enforcement request using an encryption scheme such as OpenSSL. This means that the signer certificate can be verified towards a trusted certificate or certificate chain, locally stored. Furthermore, a check can be performed that the signer certificate has not been revoked or expired. This is important to ensure a malicious user or application does not attempt to spoof a policy rule to obtain improved service or free network resource usage. The policy contact point may also use the digital signature to verify that the common name (e.g. Netflix.com) in the signer certificate matches a service provider for which the network will accept policies. This latter point is important because a network operator may require that a service provider pay to have certain policies implemented for its users.

Figure 5:
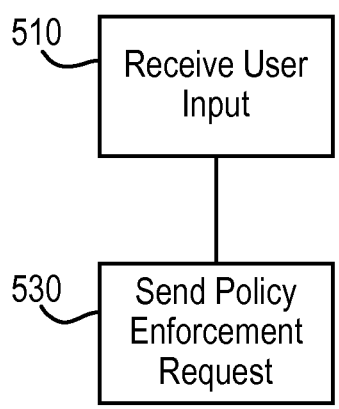
FIG. 5 illustrates a method implemented in a user device.

FIG. 5 illustrates a method implemented in a user device, the user device arranged to communicate with a service provider using a network. The method comprises receiving 510 a user input requesting initiation of communication with the service provider; and in response thereto, sending 530 a policy enforcement request to a policy contact point in the network. The policy enforcement request may comprise the name of the service provider and the at least one policy rule.

Figure 6:
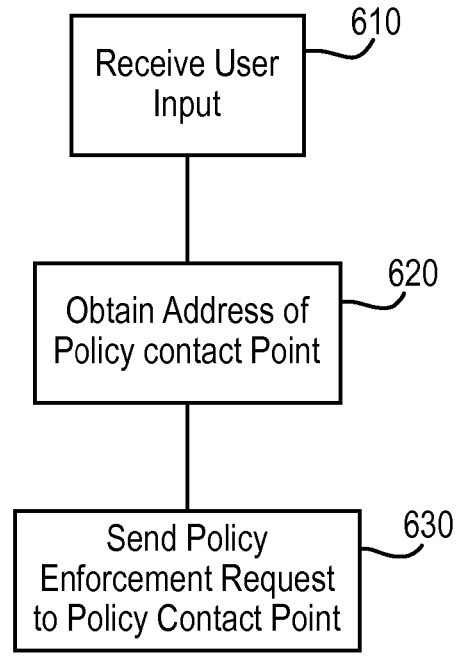
FIG. 6 illustrates another method implemented in a user device.

FIG. 6 illustrates another method implemented in a user device, the user device arranged to communicate with a service provider using a network. The method comprises receiving 610 a user input requesting initiation of communication with the service provider. The method further comprises, in response thereto, consulting 620 a domain name server to identify the address of a policy contact point in the network, and sending 630 a policy enforcement request to a policy contact point in the network.

The user input requesting initiation of communication with the service provider may comprise the user starting an application on the user device. The application may be provided by the service provider.

Figure 7:
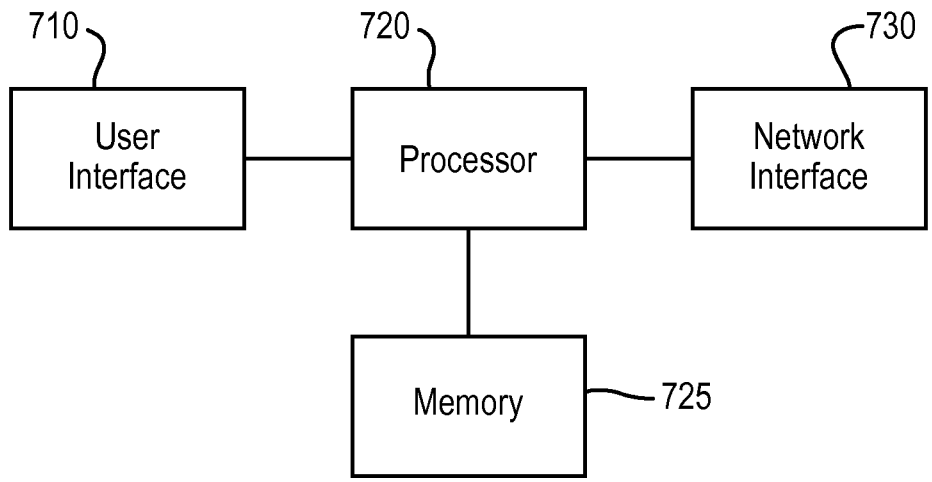
FIG. 7 illustrates a user device for performing the methods or for use with the systems described herein.

FIG. 7 illustrates a user device for performing the methods or for use with the systems described herein. The user device is arranged to communicate with a service provider using a network, and it comprises a processor 720 and a memory 725. The memory 725 contains instructions executable by said processor whereby said apparatus is operative to: receive a user input requesting initiation of communication with the service provider; and in response thereto send a policy enforcement request to a policy contact point in the network.

The user device may comprise a means 710 for receiving a user input requesting initiation of communication with the service provider. The user device may further comprise a means 730 for sending a policy enforcement request to a policy contact point in the network in response to said user input requesting initiation of communication with the service provider.

There is further provided a user device comprising an antenna, display, transceiver, processor and memory, said memory containing instructions executable by said processor whereby said user terminal is operative to: receive a user input requesting initiation of communication with the service provider; and in response thereto send a policy enforcement request to a policy contact point in the network. The user device may be adapted to store a message e.g. in a memory such as a flash drive or a hard disk.

The at least one policy rule may comprise a charging rule, or a traffic handling rule. A charging rule may comprise charging a user account associated with the user device for using the service with a charge outside of their normal data plan. Such a charge may be zero. The service provider may pay for, or subsidize the cost of using the network.

The policy enforcement request may be generated by an application running on the user device and arranged to manage services and communication with the service provider. The policy enforcement request allows the service to operate in harmony with the network, with the network appropriately used.

The policy enforcement request is digitally signed by the service provider and comprises the at least one policy rule. The digital signature comprises a signer certificate, which includes a public key and the name of the service provider. The Policy Contact Point may use this to verify that the common name (e.g. Netflix.com) in the signature matches a service provider for which the network will accept policies.

The user input requesting initiation of communication with the service provider may comprise the user starting an application on the user device. The application may be an App provided by the service provider.

Figure 8:
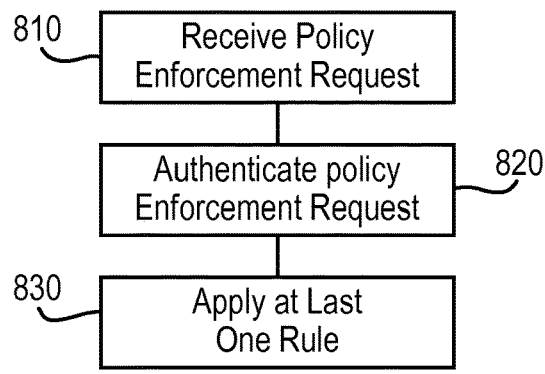
FIG. 8 illustrates a method performed in the network.

FIG. 8 illustrates a method performed in the network. The method comprises receiving 810 a policy enforcement request from a user device, the policy enforcement request comprising at least one policy rule. The method further comprises verifying 820 the authenticity of the policy enforcement request. The method further comprises applying 830, in response to an authentic policy enforcement request, the at least one policy rule received in the policy enforcement request to communications within the network and between the user device and a service provider.

There is further provided a policy contact point in a network, the policy contact point arranged to: receive a policy enforcement request from a user device, the policy enforcement request comprising at least one policy rule; verify the authenticity of the policy enforcement request; and apply, in response to an authentic policy enforcement request, the at least one policy rule received in the policy enforcement request to communications within the network and between the user device and a service provider.

Figure 9:
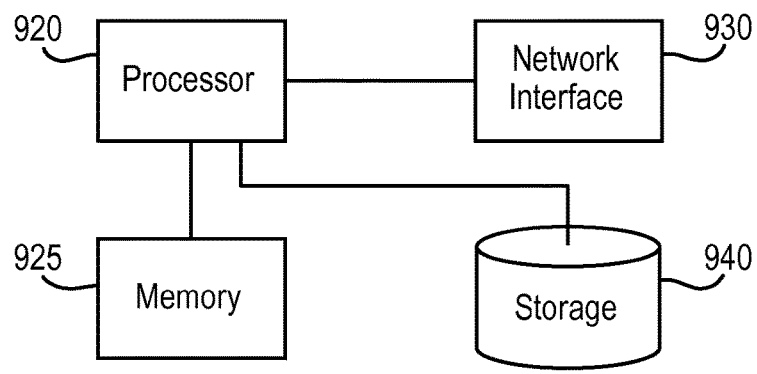
FIG. 9 illustrates a server.

FIG. 9 illustrates a server, comprising a processor 920, a memory 925, a network interface 930, and a storage device 940. The server is suitable for hosting a service for a service provider as described herein.

Figure 10:
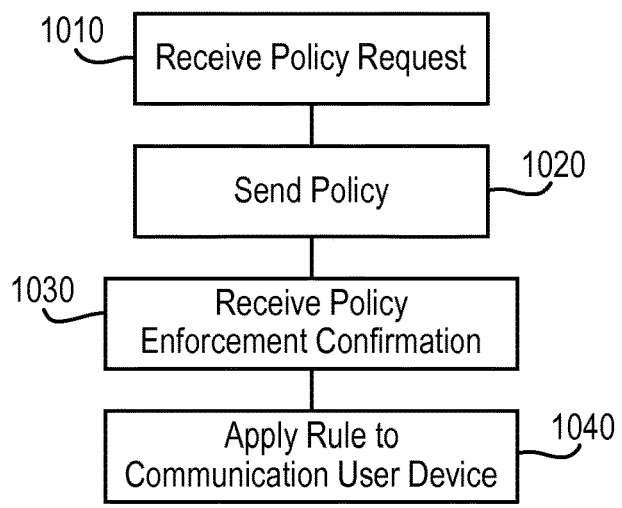
FIG. 10 illustrates a method performed in a server.

FIG. 10 illustrates a method performed in a server. The method comprises receiving 1010 a policy request from a user device; and replying 1020 with a digitally signed policy comprising at least one policy rule.

The method of FIG. 10 may additionally comprise receiving 1030, via the user device, a policy enforcement confirmation from the network, the policy enforcement confirmation comprising at least one policy rule, and in response thereto the service provider communicates with the user device in compliance 1040 with the at least one policy rule enforced.

The method may further comprise receiving a policy enforcement request from a user device when said policy enforcement request is not intercepted by a network node, and in response thereto the service provider communicates with the user device without the enforcement of a policy rule.

The method may further comprise receiving, via the user device, a policy enforcement confirmation from the network, the policy enforcement confirmation comprising at least one policy rule, and in response thereto the method comprises communicating with the user device in compliance with the at least one policy rule.

There is further provided a computer-readable medium, carrying instructions, which, when executed by computer logic, causes said computer logic to carry out any of the methods defined herein. There is further provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

According to certain of the solutions described herein, the following advantages are provided.

Solution is independent of the operating system (Android, iOS, Windows).

Policies may be digitally signed and as such are secure.

Policies can be relayed and enforced for encrypted content.

Provides support for both predefined/static and dynamic policies.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope Further, while examples have been given in the context of a particular communications network, these examples are not intended to be the limit of the communications networks to which the disclosed method and apparatus may be applied. The principles disclosed herein can be applied to any communications network which carries data, including both wired IP networks and wireless communications networks such as LTE and 3G networks.

The invention claimed is:

1. A system comprising a user device, a network, and a service provider, wherein the user device communicates with a server operated by the service provider using the network, the system arranged such that:
   in response to receipt of a user input requesting initiation of communication with the service provider:
      the user device retrieves at least one policy rule from the service provider; and
      upon retrieval of the at least one policy rule, the user device sends a policy enforcement request to a policy contact point in the network, wherein an address of the policy contact point in the network is retrieved from a Domain Name System (DNS) server by the user device; and
   the policy contact point receives the policy enforcement request and applies the at least one policy rule to the communication between the user device and the service provider.

2. The system of claim 1, wherein the user device further retrieves a policy from the service provider.

3. The system of claim 1, wherein the at least one policy rule comprises a charging rule.

4. The system of claim 3, wherein the charging rule comprises charging a user account, associated with the user device, for using a service with a charge outside of a normal data plan.

5. The system of claim 1, wherein the at least one policy rule comprises a traffic handling rule, wherein the traffic handling rule defines a range of service quality, wherein the range of the service quality includes a minimum service quality value and a maximum service quality value, and wherein the traffic handling rule further defines at least one of:
   a maximum latency;
   a minimum latency;
   a minimum bandwidth;
   a maximum bandwidth;
   a priority level;
   a rule for traffic optimization; and
   a rule for content optimization;
   for the communication between the user device and the service provider using the network.

6. The system of claim 1, wherein the policy enforcement request comprises the at least one policy rule, and wherein the at least one policy rule is digitally signed by the service provider.

7. A user device arranged to communicate with a service provider using a network, wherein the user device is arranged to:
   receive, by a transceiver, a user input requesting initiation of communication with the service provider;
   in response thereto, retrieve at least one policy rule from the service provider; and
   upon retrieval of the at least one policy rule, send, by the transceiver, a policy enforcement request to a policy contact point in the network to apply the at least one policy rule to the communication between the user device and the service provider, wherein an address of the policy contact point in the network is retrieved from a Domain Name System (DNS) server by the user device, and wherein the application of the at least one policy rule in response to the sent policy enforcement request facilitates efficient delivery of a service to the user device, which enhances a quality of experience of a user.

8. The user device of claim 7, wherein the policy enforcement request is digitally signed and comprises the at least one policy rule.

9. The user device of claim 7, wherein the user input requesting the initiation of the communication with the service provider comprises the user starting an application on the user device.

10. A method, in a user device, arranged to communicate with a service provider using a network, the method comprising:
    receiving a user input requesting initiation of communication with the service provider;
    in response thereto, retrieving at least one policy rule from the service provider; and
    upon retrieving the at least one policy rule, sending a policy enforcement request to a policy contact point in the network to apply the at least one policy rule to the communication between the user device and the service provider, wherein an address of the policy contact point in the network is retrieved from a Domain Name System (DNS) server by the user device, and wherein the application of the at least one policy rule in response to the sent policy enforcement request facilitates efficient delivery of a service to the user device, which enhances a quality of experience of a user.

11. A network comprising a policy contact point, the policy contact point comprising a processor, wherein the processor is arranged to:
    obtain a policy enforcement request from a user device, the policy enforcement request comprising at least one policy rule;
    verify authenticity of the policy enforcement request; and
    apply, in response to an authentic policy enforcement request, the at least one policy rule received in the policy enforcement request to communicate between the user device and a service provider, wherein the at least one policy rule is updated during the communication between the user device and the service provider, based on change in network conditions.

12. A method in a policy contact point, the policy contact point comprising a node within a network, the method comprising:
    receiving a policy enforcement request from a user device, the policy enforcement request comprising at least one policy rule;
    verifying authenticity of the policy enforcement request; and
    applying, in response to an authentic policy enforcement request, the at least one policy rule received in the policy enforcement request to communicate between the user device and a service provider, wherein the at least one policy rule is updated during the communication between the user device and the service provider, based on change in network conditions.

13. A service provider arranged to:
    receive, via a network interface, a policy request from a user device; and in response to the reception of the policy request, reply, via the network interface, with a digitally signed policy comprising at least one policy rule to apply the at least one policy rule to a communication between the user device and the service provider, wherein the application of the at least one policy rule facilitates efficient delivery of a service to the user device thereby enhancing a quality of experience of a user, and wherein the at least one policy rule is updated during the communication between the user device and the service provider, based on change in network conditions.

14. The service provider of claim 13, further arranged to receive, via the user device, a policy enforcement confirmation from a network, the policy enforcement confirmation comprising the at least one policy rule, and in response thereto the service provider communicates with the user device in compliance with the at least one policy rule.

15. The service provider of claim 14, further arranged to receive a policy enforcement request from the user device when said policy enforcement request is not intercepted by a network node, and in response thereto the service provider communicates with the user device.

16. A server, comprising a processor, a memory, a storage device, and a network interface, the server arranged to operate according to claim 13.

17. A non-transitory computer-readable medium, carrying instructions, which, when executed by computer logic of a user device, cause the user device to carry out the method defined by claim 10.

18. A non-transitory computer-readable medium, carrying instructions, which, when executed by computer logic of a policy contact point, cause the policy contact point to carry out the method defined by claim 12.

19. The network of claim 11, wherein the at least one policy rule comprises a traffic handling rule, wherein the traffic handling rule defines a range of service quality, and wherein the range of the service quality includes a minimum service quality value and a maximum service quality value.

20. The service provider of claim 13, wherein the at least one policy rule comprises a traffic handling rule, wherein the traffic handling rule defines a range of service quality, and wherein the range of the service quality includes a minimum service quality value and a maximum service quality value.

21. The network of claim 11, wherein the authenticity of the policy enforcement request is verified using a digital signature, and wherein the digital signature is further used to verify whether a common name in a signer certificate of the digital signature matches a service provider for which the network will accept policies.

22. The method of claim 12, wherein verifying the authenticity of the policy enforcement request comprises verifying the authenticity of the policy enforcement request using a digital signature, and wherein the digital signature is further used to verify whether a common name in a signer certificate of the digital signature matches a service provider for which the network will accept policies.

* * * * *